United States Patent [19]

Naito et al.

[11] Patent Number: 4,724,917

[45] Date of Patent: Feb. 16, 1988

[54] MOTOR DRIVEN POWER STEERING SYSTEM

[75] Inventors: Hiroshi Naito; Akio Hashimoto, both of Toyota; Hiroshi Nakashima, Nishio, all of Japan

[73] Assignee: Aisin Seiki Kabushiki Kaisha, Aichi, Japan

[21] Appl. No.: 24,985

[22] Filed: Mar. 12, 1987

[30] Foreign Application Priority Data

Mar. 13, 1986 [JP] Japan ............................ 61-55688

[51] Int. Cl.$^4$ ............................................. B62D 5/04
[52] U.S. Cl. ..................................... 180/79.1; 180/133
[58] Field of Search ...................... 180/133, 142, 79.1

[56] References Cited

U.S. PATENT DOCUMENTS

| | | | |
|---|---|---|---|
| 4,561,515 | 12/1985 | Hashimoto et al. | 180/79.1 |
| 4,573,545 | 3/1986 | Kains | 180/133 |
| 4,574,903 | 3/1986 | Hashimoto et al. | 180/79.1 |
| 4,621,701 | 11/1986 | Takabayashi et al. | 180/79.1 |
| 4,645,024 | 2/1987 | Takabayashi et al. | 180/79.1 |
| 4,660,671 | 4/1987 | Behr et al. | 180/79.1 |
| 4,666,010 | 5/1987 | Morishita | 180/79.1 |

FOREIGN PATENT DOCUMENTS 59-227560 12/1984 Japan .
60-25853 2/1985 Japan .

*Primary Examiner*—John J. Love
*Assistant Examiner*—Donn McGiehan
*Attorney, Agent, or Firm*—Burns, Doane, Swecker & Mathis

[57] ABSTRACT

A power steering system uses an electric motor to produce an auxiliary torque which is added to the torque applied to the steering wheel of vehicle by the driver. The system includes first detecting mechanism for detecting the rotating direction and rotating torque value applied to a steering shaft by a driver and producing a steering torque signal for responding to the steering torque applied to the driver, control circuit connected to the first detecting mechanism for controlling the energization of an electric motor according to the steering torque signal, coupling mechanism for coupling the motor to the steering shaft, releasing mechanism for releasing the connection between the motor and the coupling mechanism, converting mechanism for converting a part of rotating force of the motor into axial thrust force and installed in the coupling mechanism, said detecting mechanism for detecting the direction of the axial thrust force, and comparing circuit for comparing the output responding to the rotating direction of steering shaft in the first detecting mechanism with the output in the second detecting mechanism and generating a driving signal for driving the releasing means when the compared result is different from a preset condition. This permits the driver to rotate the steering shaft freely without a load of the motor when the motor is locked.

4 Claims, 3 Drawing Figures

MOTOR DRIVEN POWER STEERING SYSTEM

BACKGROUND OF THE INVENTION

1. Field of the Invention

The invention relates to a motor driven power steering system in which an auxiliary steering force is generated by an electric motor.

2. Description of the Prior Art

A conventional motor driven power steering system is shown in FIG. 3.

Referring now to FIG. 3, there is shown the general construction of a motor driven power steering system which is of the recirculating ball type. A ballnut 41 is axially slidably fitted in a steering box or casing 40. A drive shaft having a worm gear 42 is engaged with the ballnut 41 via a plurality of balls 43. Therefore, if the worm gear 42 is rotated by the drive shaft, the balls 43 are moved whereby the ballnut 41 is moved in an axial direction.

A rack 41a is formed on an outer circumferential surface of ballnut 41 and is also movable in an axial direction. The rack 41 is engaged with a sector gear 44a which is formed on a sector shaft 44. Accordingly, when the ballnut 41 moves in the axial direction as discussed above, the sector shaft 44 is rotated and the wheels of the vehicle (not shown) are steered via a steering member (not shown).

The worm gear shaft 42 is coaxially arranged with a steering shaft 45 fixed to a steering wheel (not shown). The worm shaft 42 and steering shaft 45 are connected to each other via a torsion bar 46. One end of worm shaft 42 is connected to an electrical motor 48 via a reduction gearing 47. A torque sensor 49 is provided on steering shaft 45. An output signal $s_1$ in accordance with a rotating direction and rotating torque of steering shaft 45 is supplied to a control apparatus 52 together with an output signal $s_2$ of speed sensor 14 for detecting the motor vehicle speed. The motor 48 rotates in accordance with a driving signal $S_3$ supplied from control apparatus 52.

As aforementioned, the auxiliary steering force is produced by the electric motor. However, there is a danger that the motor may burn out due to long periods of use and the rotating unit of the motor could become locked-up due to maintenance problems. In such occurrence, the manual operation of steering is impossible because generally the motor is connected to the steering shaft and the load of the locked motor is applied to the steering shaft.

SUMMARY OF THE INVENTION

Accordingly, it is an object of the present invention to provide improved motor driven power steering system which can release the connection between the motor and the steering shaft automatically so as to release the load of locked motor from steering shaft when the motor is locked and thereby permit steering by manual operation.

Another object of the present invention is to provide an improved motor driven power steering which provides smooth steering with a simple construction and low cost.

These and other objects are achieved according to the present invention by installing first detecting means for detecting the rotating direction and rotating torque value applied to a steering shaft by a driven shaft and producing a steering torque signal for responding to the steering torque control means connected to the first detecting means for controlling the energization of an electric motor according to the steering torque signal from the first detecting means, coupling means for coupling the electric motor and the steering shaft, releasing means for releasing the connection between the motor and the coupling means, converting means for converting a part of a rotating force of the motor into an axial thrust force and installed in the coupling means, second detecting means for detecting the direction of the axial thrust force, and comparing means for comparing an output responding to the rotating direction of the steering shaft in the first detecting means with the output of the second detecting means and generating a driving signal for driving the releasing means when the compared result is different from a preset condition.

Therefore, according to the present invention, when the motor is rotating in accordance with the signal from the first detecting means, the relation between the output responding to the rotating direction of the steering shaft in the first detecting means and the output of the second detecting means is within the preset condition and the releasing means is not operated. However, when the motor is in a locked-up condition, even through the steering shaft is rotated in the same direction by the driver of the vehicle, the motor is not rotated in spite of supplying the signal from the first detecting means and the rotating torque is applied to coupling means from the steering shaft. In this condition, the direction of the axial thrust force in the coupling means is the inverse direction as compared with the direction of motor rotation. Therefore, the relation between the output of the second detecting means and the output responding to the rotating direction of steering shaft in the first detecting means is outside of the preset condition and the releasing means is operated. As the result, the steering shaft is not restricted by the motor and manual steering operation is possible.

DESCRIPTION OF A PREFERRED EMBODIMENT

Hereinafter, the present invention will be explained in more detail in accordance with a preferred embodiment thereof with reference to the accompanying drawings.

Figure 1:
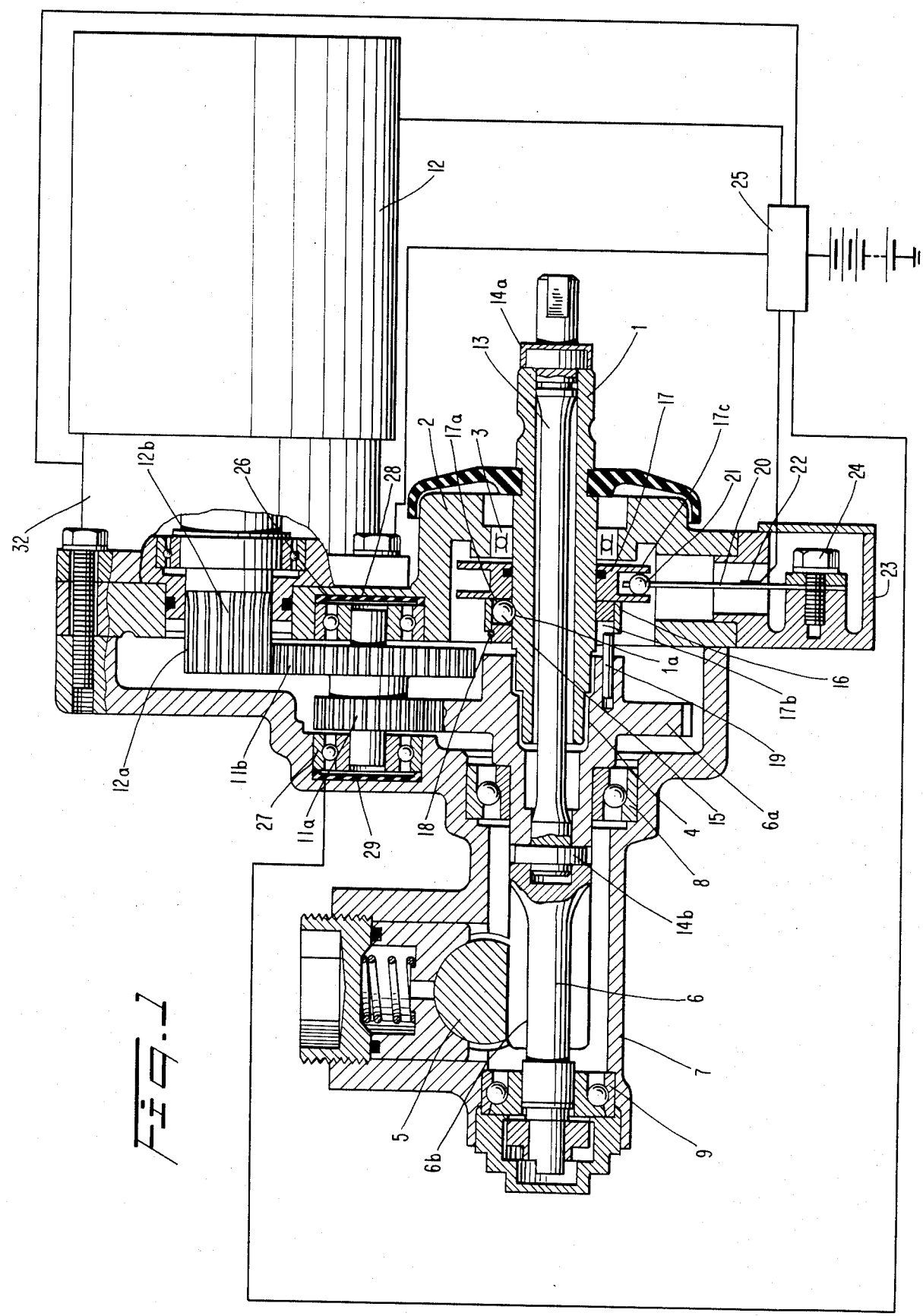
FIG. 1 is a sectional view showing an embodiment of a motor driven power steering system according to the present invention.

Referring now to FIG. 1, an input shaft 1 is connected to a steering wheel (not shown) at one end thereof and is connected to a pinion shaft 6 via a torsion bar 13. The shafts 1 and 6 are connected to the torsion bar 13 by pins 14a and 14b, respectively.

Both ends of input shaft 1 are rotatably mounted on a bearing 3 fitted in an upper housing 2 and a bearing 4 fitted in an inner circumferential surface of pinion shaft 6. The pinion shaft 6 is rotatably mounted on a pair of angular bearings 8 and 9 installed in a lower housing 7 so as to prevent the occurrence of any clearance in an axial direction.

A spur gear 6a having a large diameter portion is formed on an outer circumferential surface of the pinion shaft 6. The gear 6a is connected with a gear 12a, formed on an output shaft 12b of an electric motor 12, by intermediate gears 11a and 11b. These gears 6a, 11a, 11b and 12a comprises a coupling mechanism for coupling the motor 12 to the pinion shaft 6 and also comprise a reduction gearing arrangement. An electromagnetic clutch 32 for releasing and connecting the motor 12 to or from the coupling mechanism is positioned between the motor 12 and the output shaft 12b.

A pinion gear 6b is formed on pinion shaft 6. The pinion gear 6b is engaged with a rack 5 for steering the wheels (not shown) of the vehicle. The pinion gear 6b and the rack 5 comprise a steering gear mechanism.

Figure 2:
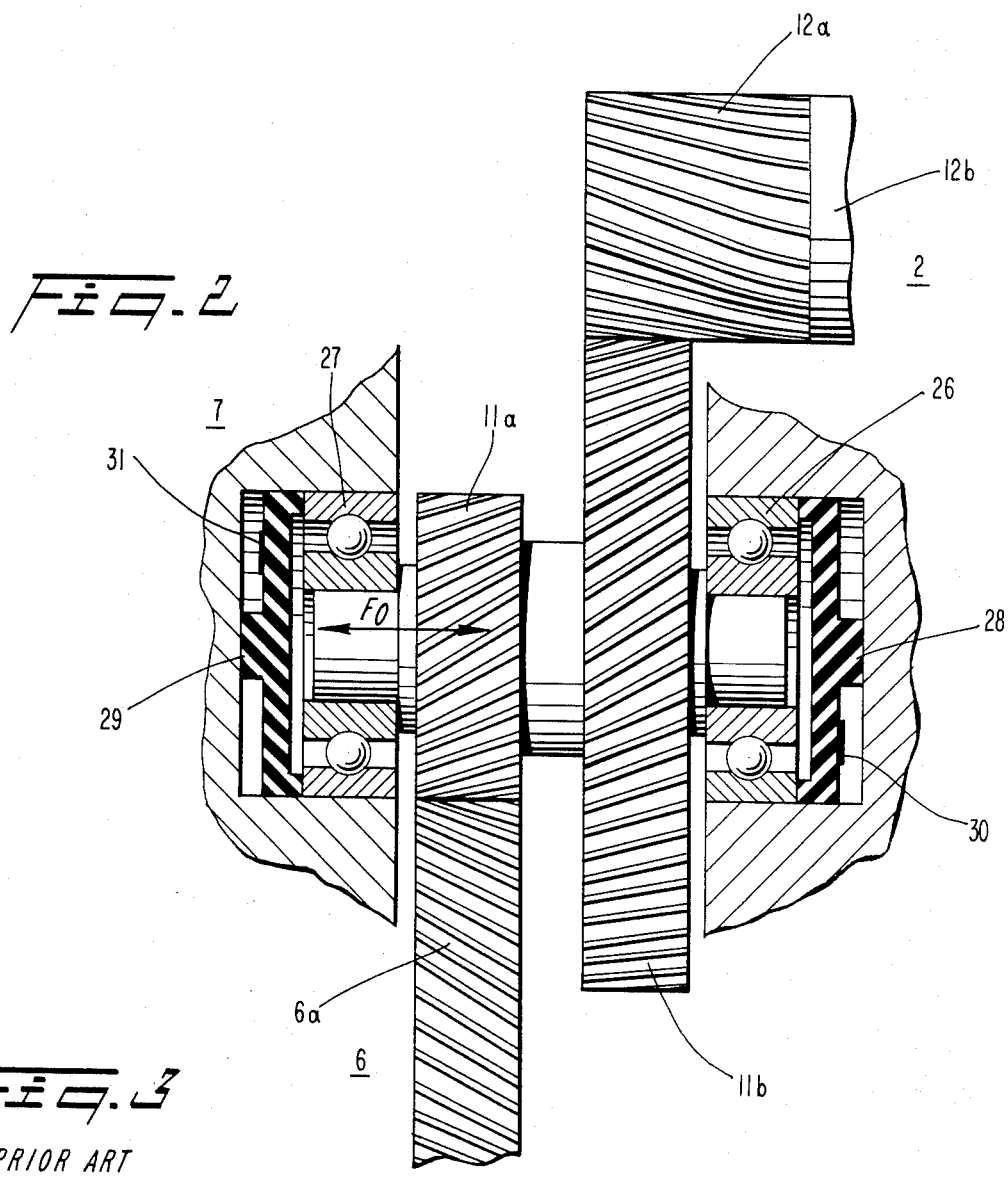
FIG. 2 is a partial sectional view showing details of mechanism elements in the embodiment of FIG. 1.
Figure 3:
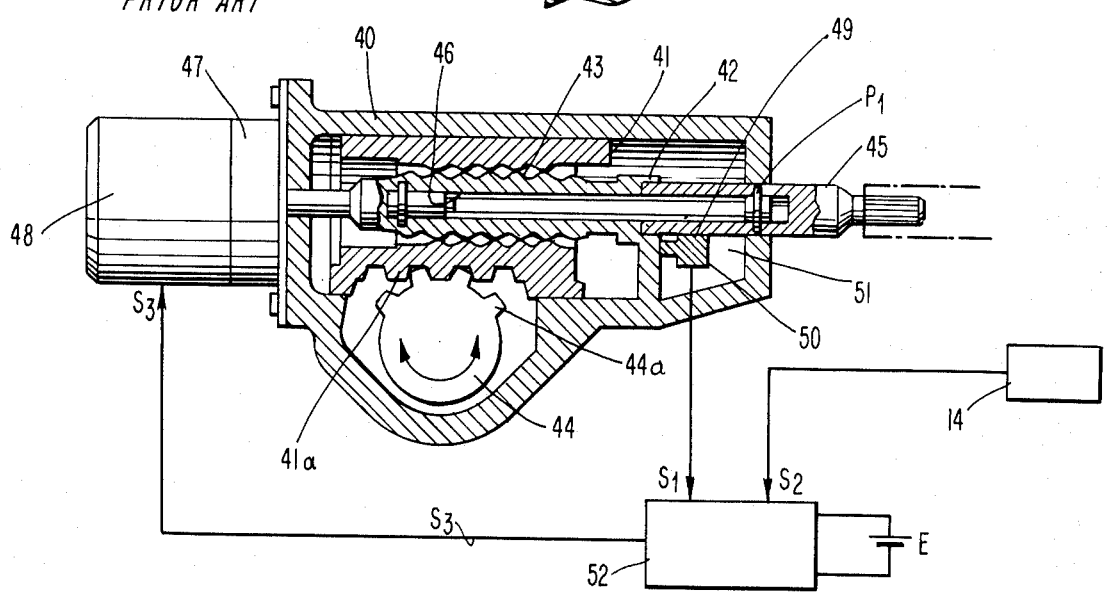
FIG. 3 is a schematic view showing a conventional motor driven power steering system.
Figure 1:
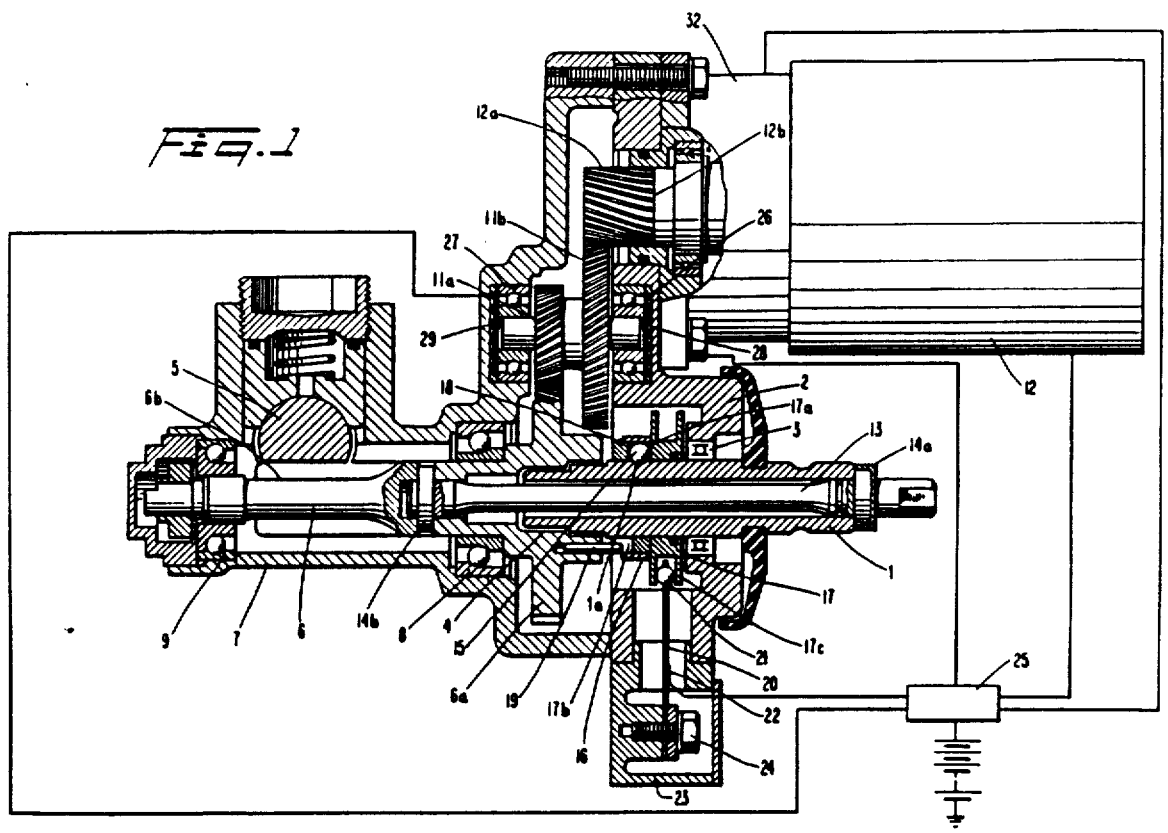

The aforesaid gears 12a, 11a, 11b and 6a of the coupling mechanism are helical gears as shown in FIG. 2.

A disk 28 is loosely fitted between the upper housing 2 and an end surface of a bearing 26 which supports a shaft portion of intermediate gear 11b. A disk 29 is loosely fitted between the lower housing 7 and an end surface of a bearing 27 which supports a shaft portion of intermediate gear 11a. Strain gauges 30 and 31 are fixed to disks 28 and 29, respectively. These strain gauges 30 and 31 are connected to a control apparatus 25 via wires, as shown in FIG. 1, respectively. These disks 28, 29 and strain gauges 30 and 31 are formed as detecting means for detecting the axially directed thrust force of intermediate gears 11a and 11b.

A helical groove 1a is formed on a central portion of input shaft 1. A ball 15 is installed in a slot 17a formed on a slider element 17 which is axially slidably mounted on input shaft 1. The ball 15 is also engaged with or received in the helical groove 1a.

An annular groove 17c is formed on an outer circumferential surface of slider element 17. A slot 17b is formed on slider 17 and extends in an axial direction. A pin 19 is fixed to pinion shaft 6 and is engaged with the slot 17b so as to slide the slider element 17 in an axial direction and rotate the slider 17 in accordance with the rotation of pinion shaft 6. The reference numeral 16 indicates an annular member engaged with the slider element 17 and the reference numeral 18 indicates an elastic ring for preventing the annular member 16 from being displaced.

A housing 23 is provided on a part of upper housing 2. A lever 20 in the form of a leaf spring is fixedly connected in the housing 23. A ball 21 is supported on one end of lever 20. The other end of lever 20 is fixed to the housing 23 by a bolt 24. The ball 21 is fitted in the annular groove 17c. A strain gauge 22, functioning as a torque sensor, is fixed to the lever 20. The torque sensor 22 detects the rotating direction and rotating torque value applied to the input shaft 1 by a driver. The output of strain gauge 22 is supplied to the motor 12 via control apparatus 25.

The basic operation of the power steering system is as follows:

If the steering wheel is rotated by the driver, the input shaft 1 rotates and the torsion bar 1 is twisted against pinion shaft 6. As the result, the input shaft 1 is rotated relative to pinion shaft 6. The helical groove 1a is, accordingly, rotated by the relative rotation between the input shaft 1 and pinion shaft 6. By the aforesaid relative rotation, the slider element 17 is given the thrust force in an axial direction via ball 15 and is directed in the axial direction in accordance with the rotational direction of input shaft 1. This displacement of slider element 17 twists the lever 20 via ball 21, and generates an output signal in accordance with the aforesaid relative rotation of strain gauge 22. This output signal of strain gauge 22 is processed by the control apparatus 25. The motor 12 is rotated in the direction corresponding to the rotating direction of input shaft 1 by the output of control apparatus 25.

The rotation of motor 12 is transmitted to pinion shaft 6 via clutch 32, gears 12a, 11b, 11a and 6a. By the rotation of pinion shaft 6, the rack 5 is moved and the tires of the vehicle are steered.

In such time, the pinion shaft 6 rotates in the direction that the aforesaid relative rotation between input shaft 1 and pinion shaft 6 is zero. As a result, the slider 17 is returned to the rest position by pin 19 so that the bending of lever 20 is zero.

Also, in the embodiment according to the present invention, the following operation is simultaneously accomplished. Namely, the coupling mechanism, gears 12, 11a, 11b, 6a are formed with helical teeth, whereby each gear 12a, 11a, 11b, 6a produces an axially directed thrust force by the rotation thereof. The axially directed thrust force is detected by the bending of disks 28 and 29 and strain gauges 30 and 31. The outputs of the strain gauges 30 and 31 are supplied to control apparatus 25.

In case of the steering wheel being rotated in a clockwise direction, the motor 12 is rotated in a clockwise direction by control apparatus 25, whereby gear 12a of output shaft 12b of motor 12 is rotated in a clockwise direction. Then intermediate gears 11a and 11b are rotated counterclockwise and gear 6a is rotated clockwise. During such operation, a leftwardly directed axial force is generated at intermediate gears 11a and 11b due to the rotational resistance of gear 6a which is driven with respect to the intermediate gear 11a. The leftwardly directed thrust force in intermediate gears 11a and 11b bends a disk 27 and the strain gauge 31 generates an electric signal (at this time, the disk 28 is not bent or deformed, therefore the strain gauge 30 does not operate). The electric signal of strain gauge 27 is compared with the output of strain gauge 22 by the control apparatus. This is the normal operation during the motor driven condition, therefore, the compared result between strain gauges 20 and 27 is within the preset condition and the control apparatus operates so as to maintain the clutch 32 in the engaged state.

On the other hand, if motor 12 is locked when the steering wheel is rotated in the clockwise direction under the same conditions noted above, the intermediate gear 11a is rotated by the gear 6a connected to input shaft 1 by the steering torque applied by the driver. In this case, the intermediate gear 11a is driven in respect to the gear 6a. Consequently, the intermediate gears 11a and 11b generate a rightwardly directed thrust force which cause the disk 26 to be bent and the strain gauge 28 to generate an electric signal. The electric signal of strain gauge 28 is compared with the output signal of strain gauge 22 by the control apparatus. This is a trouble condition of a motor driven power steering system, i.e., the compared result between strain gauge 22 and 28 is outside of the preset condition, so that the control apparatus 25 will generate the driving signal for releasing the engaged condition of clutch 32. When the clutch is released the pinion shaft 6 is freely rotated by the driver via steering wheel, input shaft 1 and torsion bar 13. Consequently, even if the motor 12 is locked, the steering operation is accomplished with manual operation by the driver of the vehicle.

Furthermore, when the steering wheel is returned to the rest position from a turned condition created by the driver, the bending of lever 20 is also released by the operation of slider element 17. Therefore, the motor 12 is not operated by the signal of strain gauge 22 by the control apparatus 25. On the other hand the intermediate gear 11a and 11b is rotated by the rotation of gear 6a in accordance with the returning rotation of steering wheel to the rest position whereby the intermediate gears 11a and 11b generate the axially directed thrust force. This axially directed thrust force is detected by one of the strain gauges 30 and 31. The control apparatus 25 does not receive a signal from strain gauge 22 to compare with the signal from one of the strain gauges 30 and 31, i.e., the relation between these signal is outside of the preset condition. The control apparatus 25 operates so as to release the engagement of clutch 32 in a manner similar to the trouble condition of the power steering system. Consequently, the returning of the steering wheel to the rest position from the turned condition is smooth as the load of motor 12 is not applied to the steering wheel by the released condition of clutch 32.

What is claimed is:

1. A motor driven power steering system comprising:
   a steering shaft;
   an electric motor;
   coupling means for coupling said electric motor to said steering shaft;
   first detecting means for detecting rotation direction and rotation torque value applied to said steering shaft and producing a steering torque signal for responding to the applied steering torque;
   control means connected to said first detecting means for controlling the energization of said motor according to said steering torque signal from said first detecting means;
   releasing means for releasing the connection between said motor and said coupling means;
   converting means for converting a part of rotating force developed by said motor into axial thrust force, said converting means positioned in said coupling means;
   second detecting means for detecting the direction of said axial thrust force; and
   comparing means for comparing an output responding to said rotating direction of said steering shaft in said first detecting means with an output of said second detecting means and generating a driving signal for driving said releasing means when the compared result is different from a preset condition.

2. A motor driven power steering system as set forth in claim 1 wherein said converting means includes a plurality of helical gears.

3. A motor driven power steering system as set forth in claim 2 wherein said second detecting means includes a disk for receiving said axial thrust force produced at said helical gear and a strain gauge fixed to said disk.

4. A motor driven power steering system as set forth in claim 2 wherein one of said plurality of helical gears is supported on a bearing.

* * * * *

UNITED STATES PATENT AND TRADEMARK OFFICE
CERTIFICATE OF CORRECTION

PATENT NO. : 4,724,917            Page 1 of 2

DATED : February 16, 1988

INVENTOR(S) : HIROSHI NAITO ET AL

It is certified that error appears in the above-identified patent and that said Letters Patent is hereby corrected as shown below:

Delete Fig. 1 and substitute therefor, the attached Fig. 1.

Signed and Sealed this

Ninth Day of August, 1988

Attest:

DONALD J. QUIGG

Attesting Officer        Commissioner of Patents and Trademarks